United States Patent
Suzuki

(10) Patent No.: US 7,532,980 B2
(45) Date of Patent: May 12, 2009

(54) NAVIGATION SYSTEM

(75) Inventor: Kensuke Suzuki, Nagoya (JP)

(73) Assignee: DENSO CORPORATION, Kariya (JP)

( * ) Notice: Subject to any disclaimer, the term of this patent is extended or adjusted under 35 U.S.C. 154(b) by 172 days.

(21) Appl. No.: 11/598,649

(22) Filed: Nov. 14, 2006

(65) Prior Publication Data
US 2007/0118276 A1    May 24, 2007

(30) Foreign Application Priority Data
Nov. 18, 2005    (JP)    ............... 2005-333543

(51) Int. Cl.
G01C 21/00    (2006.01)
G01C 21/30    (2006.01)
G01C 21/32    (2006.01)

(52) U.S. Cl. .................. 701/209; 701/200; 701/201; 701/202; 701/207; 701/213

(58) Field of Classification Search ......... 701/200–224; 340/988–996
See application file for complete search history.

(56) References Cited

U.S. PATENT DOCUMENTS 5,944,768 A    8/1999    Ito et al.
5,991,689 A    11/1999    Aito et al.
6,542,812 B1 *    4/2003    Obradovich et al. ........ 701/207
2002/0082771 A1 *    6/2002    Anderson ................... 701/209

FOREIGN PATENT DOCUMENTS

| JP | A-07-91971 | 4/1995 |
| JP | A-10-160498 | 6/1998 |
| JP | A-2001-059730 | 3/2001 |
| JP | A-2003-214879 | 7/2003 |
| JP | A-2006-017507 | 1/2006 |

* cited by examiner

Primary Examiner—Khoi Tran
Assistant Examiner—Bhavesh Amin
(74) Attorney, Agent, or Firm—Posz Law Group, PLC

(57) ABSTRACT

A user selects as a guide route a route from among multiple routes retrieved under respective predetermined retrieval conditions. A retrieval condition under which the route selected by the user was retrieved is stored in an external memory. When a zone affecting driving is recognized along the guide route based on externally acquired information on traffic, a dynamic route that bypasses the zone affecting driving is retrieved according to the retrieval condition stored in the external memory. The retrieved dynamic route is then designated as a guide route.

10 Claims, 3 Drawing Sheets

NAVIGATION SYSTEM

CROSS REFERENCE TO RELATED APPLICATION

This application is based on and incorporates herein by reference Japanese Patent Application No. 2005-333543 filed on Nov. 18, 2005.

FIELD OF THE INVENTION

The present invention relates to a navigation system that gives driving assistance according to a guide route linking a point of departure and a destination.

BACKGROUND OF THE INVENTION

A navigation system retrieves routes under respective retrieval conditions such as a condition that priority should be given to a time and a condition that priority should be given to a distance. The system then selects a route suitable for a driver's purpose from among the retrieved routes, and designates the selected route as a guide route so as to give driving assistance (refer to, for example, Patent Document 1).

Moreover, a navigation system acquires information on a traffic jam along a route from an information center. The system then designates a dynamic route, on which the traffic jam information is reflected, and gives driving assistance according to the dynamic route (refer to, for example, Patent Document 2).

In the system described in Patent Document 1, once a route suitable for a driver's purpose is designated as a guide route, driving assistance is given according to the designated guide route even when the guide route under way is determined to include a congested zone. In contrast, in the system described in Patent Document 2, when information is received to determine that driving is affected by a traffic jam included in a route under way, a dynamic route to reflect the traffic jam information may be designated so as to give driving assistance.

However, a retrieval condition under which a dynamic route is retrieved may not match a retrieval condition under which a route selected by a user has been retrieved. For instance, although an already designated guide route is retrieved with priority given to a reach time, the dynamic route may be retrieved with priority given to a distance. Otherwise, although the already designated guide route is retrieved with priority given to a distance, the dynamic route may be retrieved with priority given to a reach time.

Patent Document 1: JP-H7-91971 A
Patent Document 2: JP-H10-160498 A

SUMMARY OF THE INVENTION

The present invention addresses the foregoing problem. An object of the present invention is to retrieve a dynamic route according to a retrieval condition under which a route selected by a user has been retrieved.

According to an aspect of the present invention, a navigation system for a vehicle is provided as follows. A route retrieval unit is included to retrieve routes to a destination under a plurality of predetermined retrieval conditions. A route guide unit is included to indicate as a guide route a route selected by a user from the routes retrieved under the plurality of predetermined retrieval conditions. A memory unit is included to store a retrieval condition, under which the route selected by the user is retrieved. A traffic information acquisition unit is included to externally acquire traffic information. A dynamic route retrieval unit is included to retrieve a dynamic route, which bypasses a zone affecting driving of the vehicle, according to the retrieval condition stored in the memory unit, when recognizing the zone affecting driving along the guide route based on the acquired traffic information. A new route designation unit is included to designate as a guide route the dynamic route retrieved by the dynamic route retrieval unit.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
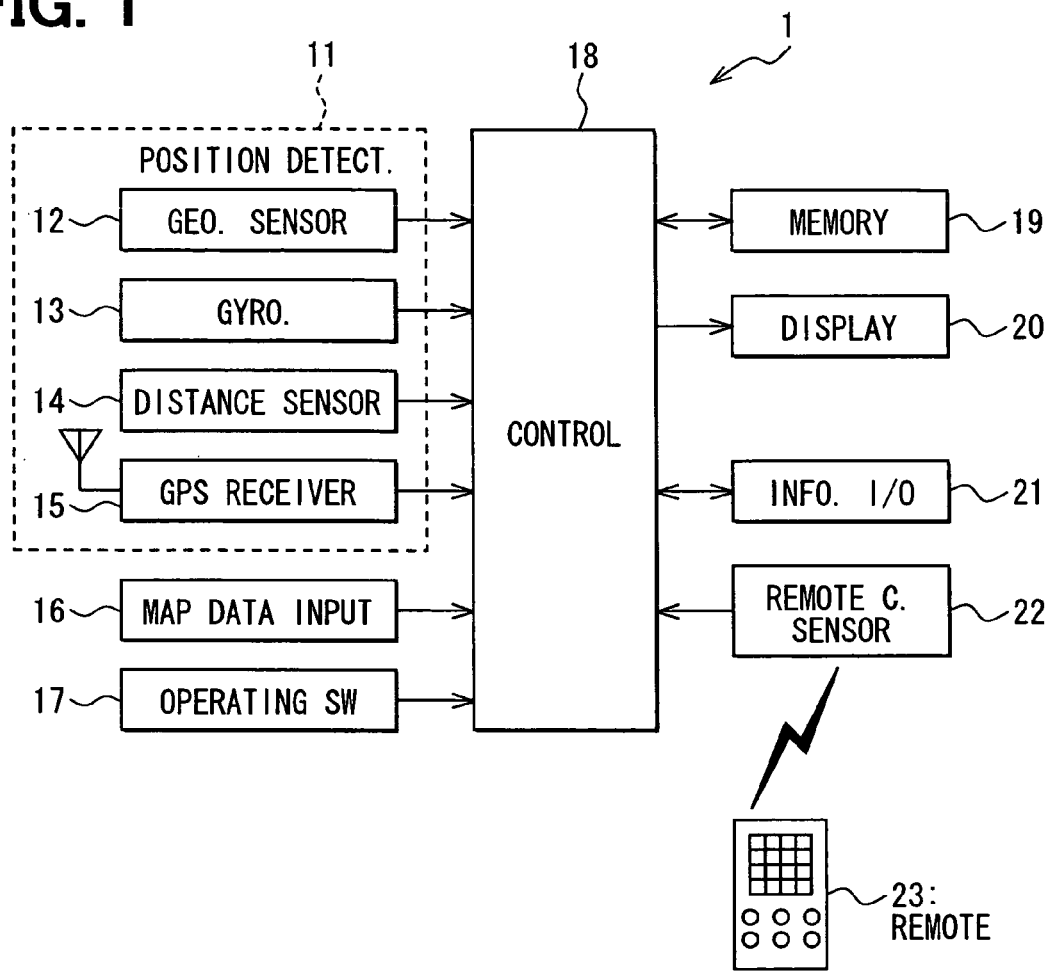
FIG. 1 shows a configuration of a navigation system as an example in accordance with an embodiment of the present invention.

A navigation system will be described below as an example according to an embodiment of the present invention. The navigation system 1 is mounted in a subject vehicle, and, as shown in FIG. 1, includes a position detector 11, a map data input device 16, a group of operating switches 17, an external memory 19, a display device 20, an external information input/output device 21, a remote-control sensor 22, and a control circuit 18 connected to these units.

The position detector 11 includes a geomagnetic sensor 12, a gyroscope 13, a distance sensor 14, and a global positioning system (GPS) receiver 15 for use in implementing a GPS that detects the position of a vehicle on the basis of radio waves received from satellites. These components are already known. The sensors and others 12 to 15 produce errors of different natures respectively. Therefore, the multiple sensors complement each other.

The map data input device 16 is used to enter map data for map display, map matching, and route guide. Storage media to store these map data items include a CD, a DVD, and a hard disk drive. The map data for route guide is formed as road network data and used to retrieve a route as described later.

The group of operating switches 17 includes touch-sensitive switches superimposed on the display screen of the display device 20, and mechanical switches formed on the perimeter of the display screen of the display device 20. The group of operating switches 17 is used to make various entries.

The control circuit 18 is designed as a computer including a CPU and an internal memory or the like. The CPU processes according to programs stored in the internal memory.

The external memory 19 is a memory unit included separately from the internal memory of the control circuit 18, and realized with a ROM or a RAM. Various data items and programs are stored in the external memory 19. In the example, the external memory 19 has an area to store a time-first flag and a distance-first flag that will be described later.

The display device 20 has a display screen made of a liquid crystal or the like. A picture is displayed on the display screen according to a video signal received from the control circuit 18.

The external information input/output device 21 receives external information such as information on traffic, which is provided externally (for example, by an information center such as a VICS center), transfers the information to the control circuit 18, or transmits information received from the control circuit 18 to outside. The traffic information received via the external information input/output device 21 includes information on a traffic accident, information on a traffic jam, information on speed limit, and information on closure.

The remote-control sensor 22 transfers a signal received from a remote control 23 that transmits a radio signal by infrared light or the like responsively to user's manipulations, to the control circuit 18.

When an ignition switch is turned on, power is supplied from a battery to the navigation system 1 having the foregoing components. This makes the navigation system 1 operational. The control circuit 18 initiates car position calculation and map display. The car position calculation calculates the position of a vehicle based on a signal received from the position detector 11. The map display displays, on the display screen of the display device 20, a map and a car position mark superimposed on the map to show the position of the vehicle and its surroundings. Moreover, the control circuit 18 resets the time-first flag and distance-first flag in the external memory 19 when it starts up.

When a user uses the group of operating switches 17 or the remote control 23 to designate a destination, the control circuit 18 performs route retrieval in which road network data is used to retrieve an optimal guide route linking a point of departure and the destination. As a means for retrieving the optimal guide route, the Dijkstra method is known.

Moreover, during the route retrieval, the control circuit 18 retrieves routes under three respective conditions of retrieval or standards including a condition that priority should be given to a reach time, a condition that priority should be given to a distance, and another given condition, and designates one of the retrieved routes, which is selected by a user, as a guide route.

Reach time-first route retrieval is to retrieve a reach time-first guide route, or to retrieve a guide route with priority given to a reach time required to reach a destination from a point of departure. In other words, a route is retrieved to reduce the reach time required to reach the destination. Specifically, predetermined speeds are assigned to respective road types (highways, freeways, open roads), and an estimated reach time required to reach the destination is calculated. The guide route reducing the reach time required to reach the destination is then retrieved.

Distance-first route retrieval is to retrieve a distance-first guide route, or in other words, to retrieve a guide route with priority given to a distance from a point of departure to a destination. A route shortening the distance to the destination is retrieved.

Another given route retrieval is to retrieve a route, which avoids part of a route retrieved through reach time-first route retrieval, using the same algorithm as the one employed in the reach time-first route retrieval. A route partly different from a route retrieved through the reach time-first route retrieval is retrieved.

Figure 2:
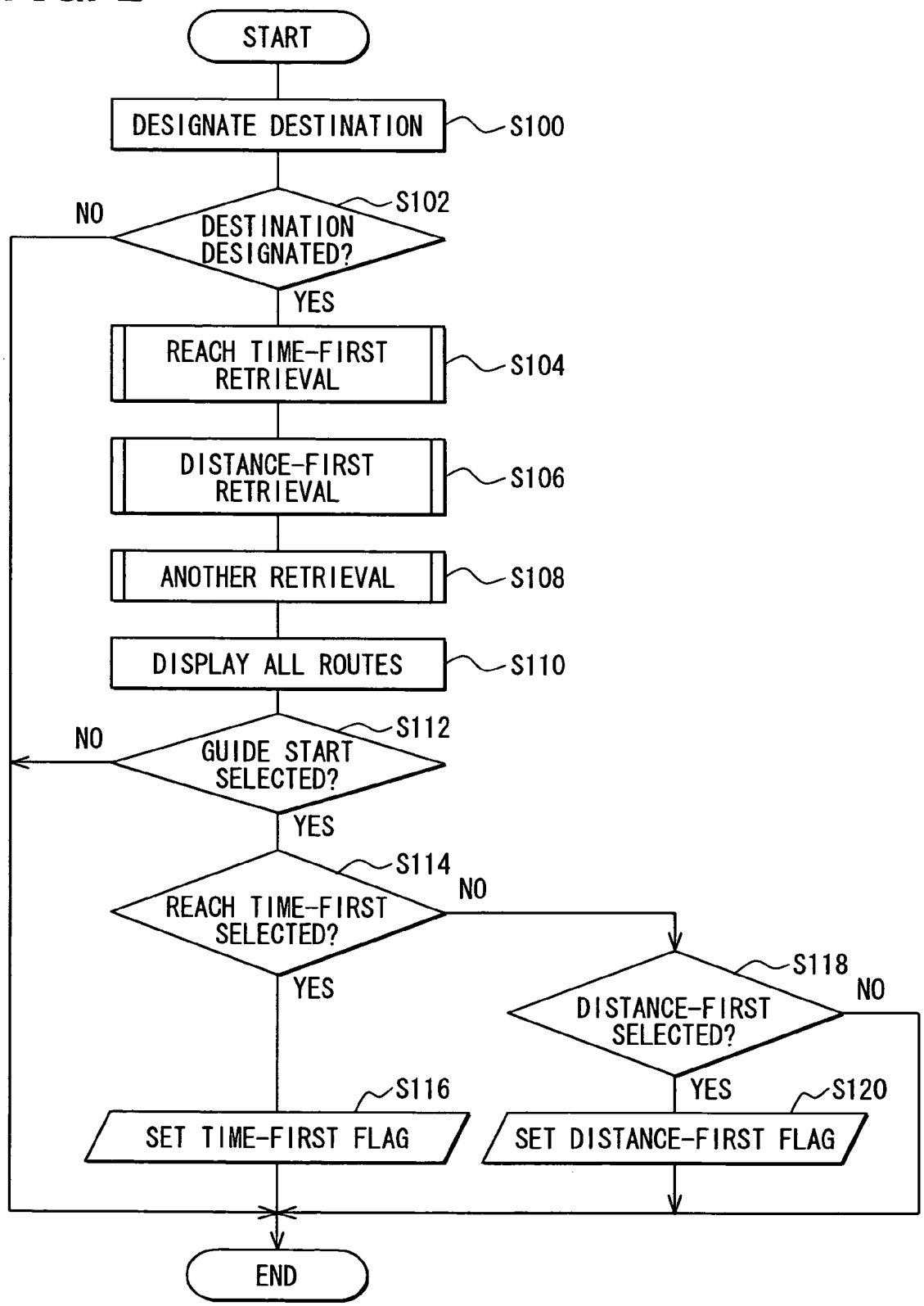
FIG. 2 shows a flowchart diagram illustrating a route retrieval to be performed by a control circuit.

Next, referring to FIG. 2, the aforesaid route retrieval will be described below. When a user performs manipulations to designate a destination, that is, selects any of alphabetical retrieval, facility retrieval, telephone number retrieval, and address retrieval so as to designate a destination, the control circuit 18 initiates route retrieval described in FIG. 2.

To begin with, a destination is designated (S100). Specifically, a retrieval screen image presenting options of alphabetical retrieval, facility retrieval, telephone number retrieval, and address retrieval is displayed responsively to manipulations performed in order to designate the destination. Search is performed under a condition which a user selects through the retrieval screen image. When the destination is retrieved, the result of the retrieval is displayed on the display screen of the display device 20. A current position is stored as a point of departure together with the retrieved destination in the external memory 19. When the destination is not retrieved, the fact that the destination has not been retrieved is displayed on the display screen of the display device 20.

Thereafter, whether a destination has been designated is decided based on a decision made on whether a destination is stored in the external memory 19 (S102).

When a destination is not stored in the external memory 19, a decision is made in the negative (No) at Step S102. The processing is terminated. When the user performs manipulations to designate a destination, the route retrieval described in FIG. 2 is initiated.

When a destination is stored in the external memory 19, a decision is made in the affirmative (Yes) at Step S102. Thereafter, reach time-first route retrieval is performed (S104). During the reach time-first route retrieval, a reach time-first guide route is retrieved, or in other words, a guide route is retrieved with priority given to a reach time required to reach the destination. A retrieved route is then stored in the external memory 19.

Thereafter, distance-first route retrieval is performed (S106). During the distance-first route retrieval, a distance-first guide route is retrieved, or in other words, a guide route is retrieved with priority given to a distance to the destination. A retrieved route is stored in the external memory 19.

Thereafter, another given route retrieval is performed (S108). During the given route retrieval, a route that avoids part of a guide route retrieved through the reach time-first route retrieval is retrieved as mentioned above. A retrieved route is stored in the external memory 19.

Thereafter, all the routes retrieved through the foregoing route retrievals are depicted in a map (S110). Specifically, all the retrieved routes are superimposed on the map displayed on the display screen of the display device 20 so that each of the routes can be selected. In addition, the following are also displayed: (i) a selector for use in orderly selecting the retrieved routes responsively to user's manipulations, (ii) a guide initiator (or guide start) for use in instructing initiation of guide, and (iii) a canceller for use in canceling a manipulation.

Thereafter, whether initiation of guide has been selected is decided based on a decision made on whether a user has touched the guide initiator (S112).

Assuming that the user does not touch the guide initiator but touches the canceller, a decision is made in the negative at Step S112. The processing is terminated.

Assuming that a specific one of all the routes superimposed on the map is selected responsively to the user's touch of the selector, when the guide initiator is touched, a decision is made in the affirmative at Step S112. Thereafter, a decision is made on which of the routes is selected by the user.

At Step S114, a decision is made on whether the user has selected the reach time-first route retrieved through the reach time-first route retrieval. At Step S118, a decision is made on whether the user has selected the distance-first route retrieved through the distance-first route retrieval.

When the route selected by the user is the reach time-first route, a decision is made in the affirmative at Step S114. The time-first flag in the external memory 19 is then set (S116), and the processing is terminated.

When the user-selected route is the distance-first route, a decision is made in the affirmative at Step S118. The distance-first flag in the external memory 19 is then set (S120), and the processing is terminated.

When the user selects the route retrieved through the given route retrieval, a decision is made in the negative at Step S118, and the processing is terminated.

Incidentally, the time-first flag and distance-first flag are used to distinguish a user-selected route for dynamic route retrieval that will be described later. Moreover, whether the user has selected the route retrieved through the given route retrieval can be decided based on the fact that neither the time-first flag nor the distance-first flag in the external memory 19 is set. Therefore, a flag indicating the route retrieved through the given route retrieval is not stored in the external memory 19.

Moreover, the control circuit 18 initiates driving assistance according to the guide route, which is retrieved through the aforesaid route retrieval, in response to a user's instruction of initiation of guide. Specifically, assuming that the user has selected a reach time-first route, the driving assistance is initiated with the reach time-first route as the guide route. Assuming that the user has selected a distance-first route, the driving assistance is initiated with the distance-first route as the guide route. Assuming that the user has selected a route retrieved through given route retrieval, the driving assistance is initiated with the route, which is retrieved through the given route retrieval, as the guide route.

Moreover, the control circuit 18 included in the navigation system 1 gives driving assistance according to a guide route designated through the aforesaid route retrieval. Moreover, the control circuit 18 acquires information on traffic via the external information input/output device 21. When the control circuit recognizes that the traffic information contains information (for example, a traffic jam) which affects driving along the route, the control circuit performs dynamic retrieval that designates a dynamic route which bypasses a zone along the route that affects the driving.

Figure 3:
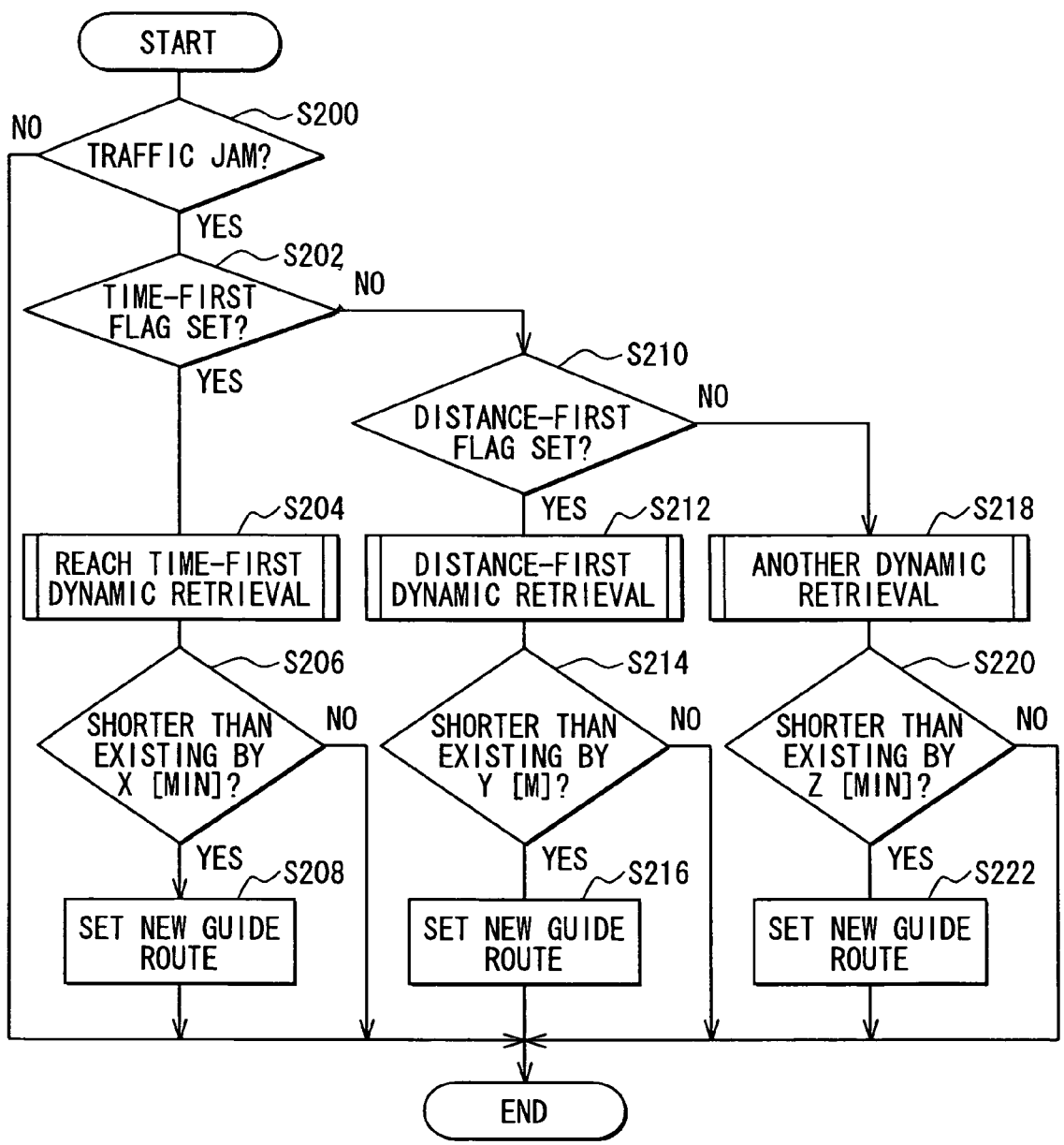
FIG. 3 shows a flowchart diagram illustrating a dynamic retrieval to be performed by the control circuit.

FIG. 3 describes dynamic retrieval to be performed by the control circuit 18. Assuming that a vehicle in which the navigation system 1 is mounted enters a communication area where a roadside machine installed on a road can communicate with others, when the navigation system receives information on traffic from the roadside machine via the external information input/output device 21, the control circuit 18 stores the received traffic information in the external memory 19 and initiates the processing described in FIG. 3.

To begin with, a decision is made on whether a traffic jam affecting driving is found along a designated route (S200). Specifically, the position of a vehicle along the guide route is identified based on a car position calculated through car position calculation and the guide route retrieved through route retrieval. Based on the traffic information stored in the external memory 19, a decision is made on whether a zone where a traffic jam affecting driving has taken place is found along the guide route along which the driving will proceed.

When a zone where a traffic jam affecting driving has occurred is not found along the guide route, a decision is made in the negative at Step S200. The dynamic retrieval is then terminated, and driving assistance is continuously given according to the already designated guide route.

When a zone where a traffic jam affecting driving has occurred is found along the guide route, a decision is made in the affirmative at Step S200. Thereafter, a decision is made on whether the time-first flag in the external memory 19 is set (S202).

When the time-first flag in the external memory 19 is set, a decision is made in the affirmative at Step S202. Thereafter, reach time-first dynamic retrieval in which priority is given to a reach time required to reach a destination is performed (S204).

Figure 4:
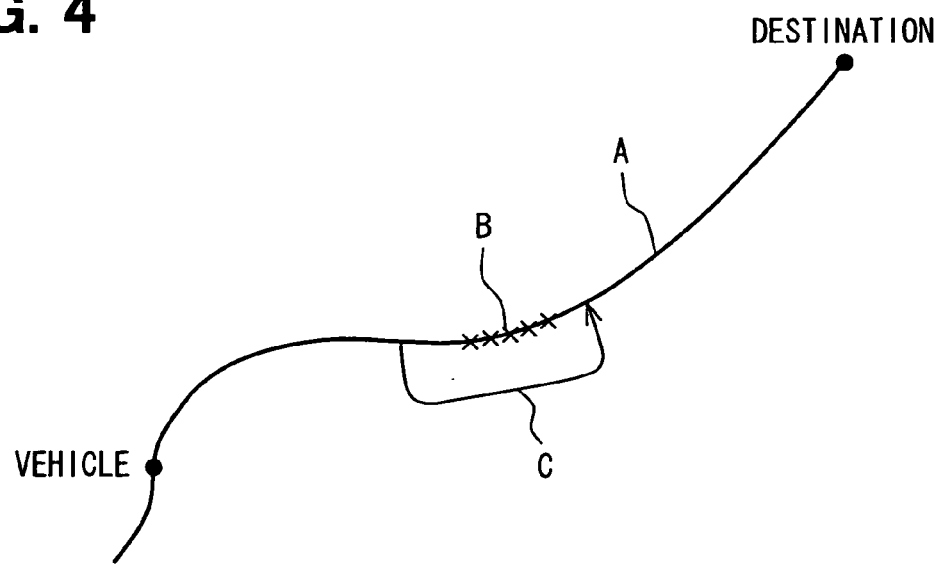
FIG. 4 is an explanatory diagram concerning the dynamic retrieval.

The reach time-first dynamic retrieval is such that: a zone having a traffic jam affecting driving is identified along a guide route, which is retrieved through reach time-first retrieval, based on the received traffic information; and a dynamic route that bypasses the identified zone is retrieved with priority given to a reach time required to reach a destination. For instance, as shown in FIG. 4, a congested zone B is found along a guide route A along which driving will proceed. In this case, a bypass C that bypasses the congested zone B is retrieved with priority given to a reach time required to reach the destination.

Thereafter, a decision is made on whether an estimated new-route reach time required to reach a destination along a new route retrieved through reach time-first dynamic retrieval is shorter than an estimated existing-route reach time, which is required to reach the destination along an existing route already designated as a guide route, by greater than or equal to a predetermined reference time X (min) (S206).

Specifically, first, an estimated new-route reach time required to reach a destination along a new route is calculated using, similarly to the reach time-first route retrieval, speeds predetermined in association with road types (highways, freeways, and open roads). Thereafter, an estimated time required to pass through a zone other than a congested zone is calculated using the speeds predetermined in association with the road types. An estimated time required to pass through the congested zone is calculated using a predetermined driving speed at which the congested zone will be passed through (speed determined to be lower than a speed at which a zone that is not congested is passed through). The calculated estimated times are added up in order to work out an estimated existing-route reach time required to reach the destination along an existing route. A decision is then made on whether the estimated new-route reach time is shorter than the estimated existing-route reach time by greater than or equal to the predetermined reference time X (min).

When the estimated new-route reach time is shorter than the estimated existing-route reach time by greater than or equal to the predetermined reference time X (min), a decision is made in the affirmative at Step S206. The new route retrieved through reach time-first dynamic retrieval is designated in place of the existing route already designated as a guide route (S208). The processing is then terminated. The control circuit 18 gives driving assistance according to the newly designated guide route.

Assuming that a vehicle enters a communication area where the next roadside machine installed on a road communicates with the others, when the navigation system receives information on traffic from the roadside machine via the external information input/output device 21, the control circuit 18 resumes the processing described in FIG. 3.

When the estimated reach time is not shorter than the estimated existing-route reach time by greater than or equal to the predetermined reference time X (min), a decision is made in the negative at Step S206. The existing route is kept adopted as a guide route, and the processing is terminated.

Moreover, when the time-first flag in the external memory 19 is not set, a decision is made in the negative at Step S202.

Thereafter, a decision is made on whether the distance-first flag in the external memory 19 is set (S210).

When the time-first flag in the external memory 19 is set, a decision is made in the affirmative at Step S210. Thereafter, distance-first dynamic retrieval giving priority to a distance to a destination is performed (S212).

The distance-first dynamic retrieval is such that: a zone having a traffic jam affecting driving is identified along a guide route, which is retrieved through distance-first retrieval based on the received traffic information; and a dynamic route bypassing the identified zone is retrieved with priority given to a distance to a destination. For instance, as shown in FIG. 4, a congested zone B is found along a guide route A along which driving will proceed. In this case, a bypass c bypassing the congested zone B is retrieved with priority given to the distance to the destination.

Thereafter, a decision is made on whether the length of a new route retrieved through distance-first dynamic retrieval is shorter than the length of an existing route already designated as a guide route, which is calculated in prospect of a traffic jam, by greater than or equal to a predetermined distance Y (m) (S214).

To be more specific, first, the length of the new route retrieved through distance-first dynamic retrieval is calculated. Thereafter, the length of a zone included in the existing route other than a congested zone is calculated. A product of the distance of the congested zone by a predetermined coefficient a (where a is larger than 1) is added to the length of the zone included in the existing route other than the congested zone, whereby the length of the existing route calculated in prospect of the traffic jam is calculated. A decision is then made on whether the length of the new route is shorter than the length of the existing route already designated as a guide rote, which is calculated in prospect of the traffic jam, by greater than or equal to the predetermined distance Y (m).

When the length of the new route is shorter than the length of the existing route, which is calculated in prospect of the traffic jam, by the predetermined distance Y (m) or more, a decision is made in the affirmative at Step S214. The new route retrieved through distance-first dynamic retrieval is designated as a guide route in place of the existing route already designated as the guide route (S216), and the processing is terminated. The control circuit 18 then gives driving assistance according to the newly designated guide route.

Moreover, when the length of the new route is not shorter than the length of the existing route, which is calculated in prospect of a traffic jam, by greater than or equal to the predetermined distance Y (m), a decision is made in the negative at Step S214. The existing route is kept adopted as the guide route, and the processing is terminated. The control circuit 18 gives driving assistance according to the already designated guide route.

When neither the time-first flag nor the distance-first flag in the external memory 19 is set, a decision is made in the negative at Steps S202 and S210. Thereafter, another given dynamic retrieval is performed (S218).

The given dynamic retrieval is such that: a zone having a traffic jam affecting driving is identified along a guide route, which is retrieved through the given route retrieval, based on the received traffic information; and a dynamic route that bypasses the identified zone is retrieved with priority given to a reach time required to reach a destination.

Thereafter, a decision is made on whether an estimated new-route reach time required to reach a destination along a new route retrieved through the given dynamic retrieval is shorter than an estimated existing-route reach time, which is required to reach the destination along an existing route already designated as a guide route, by greater than or equal to a predetermined reference time Z (min) (S220).

Specifically, similarly to the distance-first dynamic retrieval, the length of a new route is calculated by following the route. The length of a zone included in an existing route other than a congested zone and a product of the distance of the congested zone by a coefficient a (where a is larger than 1) are added up in order to work out the length of the existing route in prospect of the traffic jam. A decision is made on whether the length of the new route is shorter than the length of the existing route already designated as the guide route, which is calculated in prospect of the traffic jam, by greater than or equal to a predetermined distance Y (m).

When the estimated new-route reach time is shorter than the estimated existing-route reach time by greater than or equal to the predetermined reference time Z (min), a decision is made in the affirmative at Step S220. The new route retrieved through given dynamic retrieval is designated as a guide route in place of the existing route already designated as the guide route (S222), and the processing is terminated. The control circuit 18 gives driving assistance according to the newly designated guide route.

Moreover, when the estimated reach time is not shorter than the estimated existing-route reach time by greater than or equal to the predetermined reference time Z (min), a decision is made in the negative at Step S220. The processing is terminated with the existing route kept adopted as the guide route. The control circuit 18 gives driving assistance according to the already designated guide route.

Owing to the foregoing constituent features, a retrieval condition under which a user-selected route is retrieved is stored in the external memory 19. When a zone affecting driving is recognized along a guide route based on externally acquired information on traffic, a dynamic route that bypasses the zone affecting driving is retrieved according to the retrieval condition stored in the external memory 19. The retrieved dynamic route is designated as a guide route. Consequently, the dynamic route can be retrieved according to the retrieval condition under which a user-selected route is retrieved.

Moreover, the dynamic route is designated as the guide route only when a reach time required to reach a destination along a dynamic route retrieved through reach time-first route retrieval is recognized to be shorter than a reach time, which is required to reach the destination along an already designated guide route, by greater than or equal to a predetermined reference time. This helps prevent the designation of the dynamic route as the guide route from causing the reach time required to reach the destination to get longer.

Moreover, the dynamic route is designated as the guide route only when a distance to a destination along a dynamic route retrieved through distance-first route retrieval is recognized to be shorter than a distance to the destination along an already designated guide route by greater than or equal to a predetermined distance. Consequently, this helps prevent the designation of the dynamic route as the guide route from causing the distance to the destination to get longer.

The dynamic route is designated as the guide route only when a reach time required to reach a destination along a dynamic route retrieved through another given route retrieval is recognized to be shorter than a reach time, which is required to reach the destination along an already designated guide route, by greater than or equal to a predetermined reference time. Consequently, this helps prevent the designation of the dynamic route as the guide route from causing the reach time required to reach the destination to get longer.

(Modification)

For example, in the foregoing example, another given route retrieval is to retrieve a route that avoids part of a route retrieved through reach time-first route retrieval. Alternatively, a route that avoids part of a route retrieved through distance-first route retrieval may be retrieved.

In the aforesaid example, route retrieval and dynamic retrieval are performed by adopting as three retrieval conditions a condition that priority should be given to a reach time, a condition that priority should be given to a distance, and another given condition. Alternatively, the route retrieval may be performed by adopting a condition that the number of turns to be made at intersections preceding a destination should be minimized, a condition that priority should be given to highways, or a condition that priority should be given to open roads.

In the aforesaid example, routes leading to a destination are retrieved under respective retrieval conditions, and a route which a user selects from among the routes retrieved through route retrieval is designated as a guide route in order to give driving assistance. Alternatively, the user may be prompted to select any of the retrieval conditions, and route retrieval may be performed under the user-selected retrieval condition. The route selected through the route retrieval may then be designated as the guide route in order to give driving assistance.

In the aforesaid example, as described in conjunction with Steps S206, S216, and S220, driving along a newly retrieved dynamic route is compared with driving along an already designated guide route in order to automatically decide whether the dynamic route is designated as a guide route. Alternatively, a screen image through which a user is prompted to decide whether he/she permits changing of the guide route to another may be displayed so that the user can verify whether the guide route is changed to another.

Furthermore, alternatively, a decision may be made on whether or not a dynamic route is presented as a bypass to the user based on a retrieval condition under which a route is retrieved. In other words, depending on a retrieval condition under which a current guide route is retrieved, the dynamic route may not be not presented as a bypass. For instance, a zone affecting driving might include a point designated by the user as a passing point to need to visit.

In the aforesaid example, speeds predetermined in association with road types (highways, freeways, and open roads) are used to calculate an estimated time required to pass through a zone other than a congested zone. Alternatively, information on speed limit to be imposed during a rainy time which is contained in information on traffic may be used to calculate an estimated reach time required to reach a destination.

In the aforesaid example, at Step S214, the length of a zone included in an existing route other than a congested zone is calculated. A product of the distance of the congested zone by a predetermined coefficient a (where a is larger than 1) is added to the length of the zone included in the existing route other than the congested zone, whereby the length of the existing route is calculated in prospect of a traffic jam. Alternatively, the coefficient a may be varied depending on a road type (highways, freeways, or open roads). For example, once a vehicle enters a congested highway from an open road, the vehicle cannot get out of the highway until it comes to the next exit. The vehicle cannot therefore escape from the traffic jam. Therefore, the coefficient a associated with highways is set to a larger value than the coefficient a associated with open roads is, whereby a dynamic route bringing a vehicle to a congested highway will not be designated as a guide route.

In the aforesaid example, a zone along a guide route affecting driving is described by taking for instance a zone where a traffic jam has occurred. However, the present invention is not limited to the zone. Alternatively, the present invention may be applied to a zone where a traffic accident has occurred.

In the aforesaid example, at Steps S206, S214, and S220, a decision is made on whether an estimated new-route reach time is shorter than an estimated existing-route reach time by greater than or equal to a predetermined reference time. The reference time may be fixed or variable.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described examples of the present invention. However, the scope of the present invention should be determined by the following claims.

What is claimed is:

1. A navigation system for a vehicle, the navigation system comprising:

a route retrieval unit which retrieves routes to a destination under a plurality of predetermined retrieval conditions, the retrieval conditions including a reach time-first retrieval condition under which a route is retrieved with priority given to a reach time required to reach a designation, and a distance-first retrieval condition under which a route is retrieved with priority given to a distance to a destination;

a route guide unit that indicates, as a guide route, a route selected by a user from the routes retrieved under the plurality of predetermined retrieval conditions;

a memory unit which stores, among the plurality of retrieval conditions, a retrieval condition under which the route selected by the user is retrieved;

a traffic information acquisition unit that externally acquires traffic information;

a dynamic route retrieval unit that retrieves a dynamic route, which bypasses a zone affecting driving of the vehicle, when recognizing the zone affecting driving along the guide route based on the acquired traffic information, the dynamic route being retrieved under the same retrieval condition which is stored in the memory unit and under which the guide route being indicated by the route guide unit is retrieved by the route retrieval unit; and a new route designation unit that designates, as a guide route, the dynamic route retrieved by the dynamic route retrieval unit.

2. The navigation system of claim 1, wherein the route retrieval unit includes a reach time-first retrieval unit that retrieves a route under the reach time-first retrieval condition, the navigation system further comprising:

a unit that stores information, which signifies that priority is given to a time, in the memory unit, when a route retrieved by the reach time-first retrieval unit is selected by the user; and a first condition-for-retrieval check unit that determines whether information signifying that priority is given to a reach time is stored in the memory unit, wherein, when the first condition-for-retrieval check unit determines that the information signifying that priority is given to a reach time is stored in the memory unit, the dynamic route retrieval unit retrieves a dynamic route, which bypasses the zone affecting driving, with priority given to a reach time required to reach the destination.

3. The navigation system of claim 2, further comprising:
a first route check unit that executes a determination as to whether or not the reach time required to reach the destination along the dynamic route retrieved by the reach time-first retrieval unit is shorter than the reach time, which is required to reach the destination along the already designated guide route, by greater than or equal to a predetermined reference time, wherein,
when the determination executed by the first route check unit is affirmed, the new route designation unit designates the dynamic route as the guide route.

4. The navigation system of claim 1, wherein
the route retrieval unit includes a distance-first retrieval unit that retrieves a route under the distance-first retrieval condition,
the navigation system further comprising:
a unit that stores information, which signifies that priority is given to a distance, in the memory unit, when the route retrieved by the distance-first retrieval unit is selected by the user; and
a second condition-for-retrieval cheek unit that determines whether the information signifying that priority is given to a distance is stored in the memory unit, wherein,
when the second condition-for-retrieval cheek unit determines that the information signifying that priority is given to a distance is stored in the memory unit, the dynamic route retrieval unit retrieves a dynamic route, which bypasses the zone affecting driving, with priority given to the distance to the destination.

5. The navigation system of claim 4, further comprising:
a second route check unit that executes a determination as to whether or not the distance to the destination along the dynamic route retrieved by the distance-first retrieval unit is shorter than the distance to the destination along the already designated guide route by greater than or equal to a predetermined distance, wherein,
when the determination executed by the second route check unit is affirmed, the new route designation unit designates the dynamic route as the guide route.

6. The navigation system of claim 1, wherein
a decision is made on whether a dynamic route is presented as a bypass to the user based on the retrieval condition under which a route is retrieved.

7. A method used in a navigation system for a vehicle, the navigation system including:
a route retrieval unit which retrieves routes to a destination under a plurality of predetermined retrieval conditions, the retrieval conditions including a reach time-first retrieval condition under which a route is retrieved with priority given to a reach time required to reach a destination, and a distance-first retrieval condition under which a route is retrieved with priority given to a distance to a destination; and
a route guide unit that indicates, as a guide route, a route selected by a user from the routes retrieved under the plurality of predetermined retrieval conditions,
the method comprising:
storing, among the plurality of retrieval conditions, a retrieval condition, under which the route selected by the user is retrieved;
acquiring traffic information externally;
retrieving a dynamic route, which bypasses a zone affecting driving of the vehicle, the dynamic route being retrieved under the same retrieval condition which is stored and under which the guide route being indicated by the route guide unit is retrieved by the route retrieval unit, when recognizing the zone affecting driving along the guide route based on the acquired traffic information; and
designating, as a guide route, the dynamic route which is retrieved.

8. A navigation system for a vehicle, the navigation system comprising:
a route retrieval means for retrieving routes to a destination under a plurality of predetermined retrieval conditions, the retrieval conditions including a reach time-first retrieval condition under which a route is retrieved with priority given to a reach time required to reach a destination, and a distance-first retrieval condition under which a route is retrieved with priority given to a distance to a destination;
a route guide means for indicating, as a guide route, a route selected by a user from the routes retrieved under the plurality of predetermined retrieval conditions;
a memory means for storing, among the plurality of retrieval conditions, a retrieval condition, under which the route selected by the user is retrieved;
a traffic information acquisition means for externally acquiring traffic information;
a dynamic route retrieval means for retrieving a dynamic route, which bypasses a zone affecting driving of the vehicle, under the same retrieval condition which is stored in the memory means and under which the guide route being indicated by the route guide means is retrieved by the route retrieval means, when recognizing the zone affecting driving along the guide route based on the acquired traffic information; and
a new route designation means for designating, as a guide route, the dynamic route retrieved by the dynamic route retrieval means.

9. The navigation system of claim 1, wherein the zone affecting driving is where a traffic jam is found along the guide route along which driving will proceed, based on a position of the vehicle.

10. The navigation system of claim 1, wherein the zone affecting driving is where a traffic accident is found along the guide route along which driving will proceed, based on a position of the vehicle.

* * * * *